H. N. HARPER.
IRRIGATOR.
APPLICATION FILED FEB. 6, 1914. RENEWED APR. 21, 1916.
1,185,502. Patented May 30, 1916.
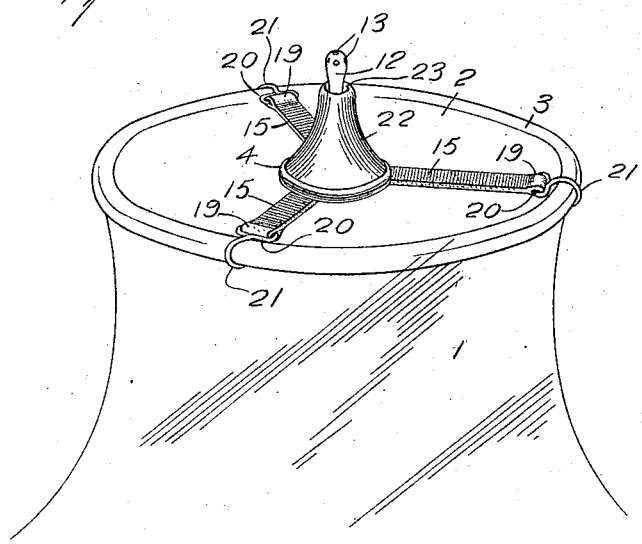
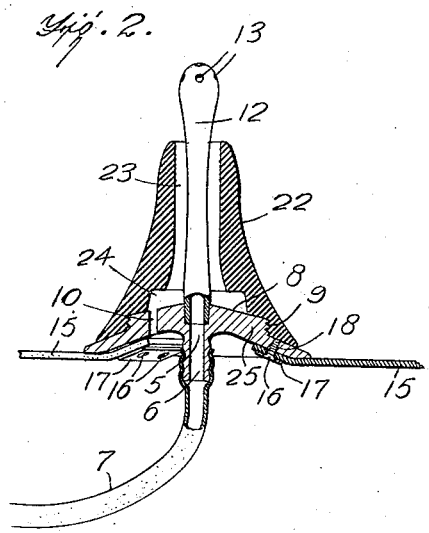
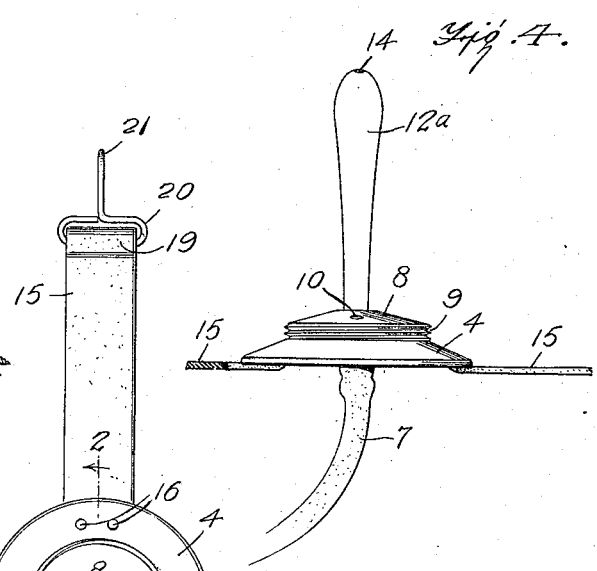
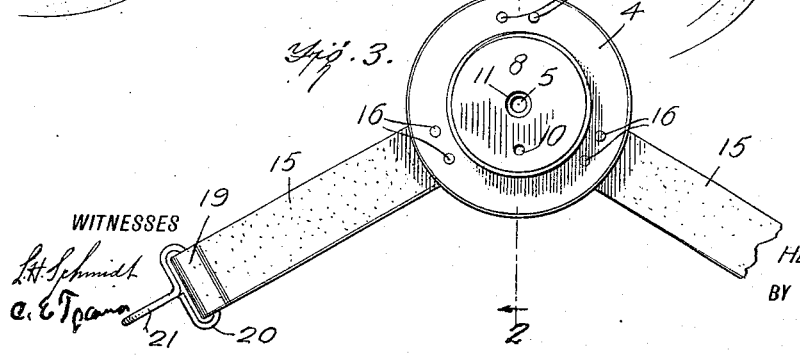
WITNESSES
INVENTOR
HENRY N. HARPER,
BY
ATTORNEYS

UNITED STATES PATENT OFFICE.

HENRY N. HARPER, OF RUSTON, LOUISIANA.

IRRIGATOR.

1,185,502. Specification of Letters Patent. Patented May 30, 1916.

Application filed February 6, 1914, Serial No. 816,928. Renewed April 21, 1916. Serial No. 92,761.

*To all whom it may concern:*

Be it known that I, HENRY N. HARPER, a citizen of the United States, and a resident of Ruston, in the parish of Lincoln and State of Louisiana, have invented a new and useful Improvement in Irrigators, of which the following is a specification.

My invention is an improvement in irrigators, and has for its object to provide a device of the character specified, capable of connection to a receptacle and arranged to be held in a central position with respect to the receptacle and in position to be engaged and to be held engaged without requiring attention from the user and leaving the hands of the user free.

In the drawings:—Figure 1 is a perspective view of the improved irrigator, Fig. 2 is a section on the line 2—2 of Fig. 3, looking in the direction of the arrows, Fig. 3 is an enlarged top plan view of a portion of the mechanism shown in Fig. 1, and Fig. 4 is a side view of the discharge tube and its support with the distending device removed.

The present embodiment of the invention is shown in connection with a receptacle 1 of any suitable material, the said receptacle having an open top 2, as shown, and the top of the receptacle is beaded or rounded, as shown at 3 to prevent injury to the person of the user.

The improvement comprises a substantially conical disk 4 of suitable material, as for instance, hard rubber or the like, the said disk having a central opening 5, and the disk is provided with a nipple 6 at the lower end of the opening, the said nipple being externally roughened or corrugated for engagement by one end of a flexible tube 7.

The disk 4 is arranged with its apex upward, and the central portion of the disk is of greater thickness than the peripheral portion thereof, as indicated at 8, so that an annular shoulder 9 is formed between the thickened portion and the peripheral portion, and the said shoulder is threaded as shown in Figs. 2 and 4.

At the thickened portion, the disk is provided with an opening 10, the said opening extending entirely through the disk. The opening 5 is at the apex of the disk, and the upper end of the said opening is counterbored or enlarged as shown at 11, to form a socket for receiving the lower end of a discharge nozzle 12. The said lower end of the discharge nozzle is shaped to fit within the counterbored portion of the opening, and the upper end of the nozzle is enlarged, and is of olive shape as shown. A plurality of nozzles is provided for different uses, the nozzle 12 shown in Fig. 2, having a series of openings 13 at the enlarged rounded end, while the nozzle 12ª shown in Fig. 4, is similar in all respects to the nozzle 12, except that it is provided in the rounded end with a single central opening 14.

The disk is supported at the center of the receptacle 1 by means of flexible straps 15, the said straps being of any suitable material, as for instance, webbing, leather, or the like. Each strap is connected at one end to the under face of the disk, the connection being made in the present instance by means of two screws 16, and a reinforcing plate 17 is arranged on the under face of each strap, the screws being passed through the reinforcing plate and through the end of the strap, and into threaded openings 18 in the disk.

The plate 17 is counterbored or reamed, so that the heads of the screws are flush with the under face of the plate. The connection between the straps and the disk is as before stated, on the under face of the disk, and at such a point that the said screws and plate will not be below the level of the under face of the supporting straps 15.

Each strap is provided at its outer end with a loop 19, and each loop is engaged by a loop 20 of a hook 21. The outer ends of the straps are doubled back upon themselves after being passed through the loops 19 of the hooks, and the hooks are arranged to engage the beaded or rounded portions of the upper end of the receptacle.

The disk is provided with three straps as shown, the said straps being spaced at equal distances from each other, and the straps are of such length that the disk is supported at the center of the top of the receptacle.

In certain uses, it is desirable to use the discharge tube with a distending device so arranged that an outlet is permitted for the solution entering through the nozzle. The said device 22, shown in Figs. 1 and 2, is approximately frusto-conical in shape, and is provided with a central opening 23 of sufficient diameter to receive the nozzles 12 and 12ª, and to leave an annular space between the said nozzles and the inner surface of the said device as shown in Fig. 2.

The distending device is arranged with its large end downward, and the said large end is shaped to fit the upper face of the disk outside of the threaded shoulder 9. The opening 23 of the distending device is enlarged near its lower end as shown at 24, the enlargement being of such diameter that when the device is in place on the disk, the upper end of the opening 10 will be uncovered and will open into the enlarged portion 24 of the bore.

Below the enlargement 24 of the bore or opening 23, the distending device is again enlarged to fit around the shoulder 9 and at this point the said bore is threaded as shown at 25 to engage the threaded shoulder 9 of the disk. The arrangement is such that when the distending device is in place, the opening 10 may communicate with the bore 23 of the distending device and the lower end or base of the said distending device will fit closely against the upper face of the disk outside the shoulder 9 to form a fluid tight joint. The upper end of the distending device is rounded to prevent injury to the user, and the said upper end is spaced below the olive shaped portion of the discharge tube.

In operation, a suitable receptacle for the solution to be injected is connected with the end of the tube 7 remote from the disk, and the said receptacle is elevated so that the solution will discharge through the openings 13, 14 of the discharge tube used. With the discharge tube 12, the solution may pass out by way of the space between the discharge tube and the interior of the distending device, the said device retaining the parts distended to permit this outward flow. The solution passes through the opening 10 into the receptacle.

It is not desired to permit the solution to discharge at once, the discharge tube 12ª is used, and the distending device is omitted. The improvement consists in effect of a support having an opening provided at its lower end with means for engagement by a supply tube and at its upper end with a socket for engagement by a discharge tube, together with a cone-shaped or tubular distending device detachably engaging the support coaxial with the central opening and interchangeable discharge tubes for connection with the support and having means for engaging the socket, each of the said tubes passing through the distending device.

It is obvious that the disk may be connected with any suitable receptacle or receiver, or the said device may be used without the receptacle, if desired. The discharge tubes 12 and 12ª may be of any desired shape and size, depending upon the purpose for which they are to be used and they may be of any suitable material, as may also the distending device 22. The said device may also be made of different sizes.

With the improved device, the hands of the user are free, and since the device is yieldingly supported, there can be no injury to the user. All of the elements of the device may be easily cleaned after use, and when separated access may be had to all of the interior of the different parts. The opening 10 being of less capacity than the discharge tube, the solution may be dammed up or held in the cavity if desired.

The straps 15 are preferably of elastic material, in order that they may yield and in order that they may stretch or contract to permit the device to be attached to different sized receptacles. The device is especially adapted for attachment to slop jars.

I claim:—

1. A device of the character specified, comprising a disk shaped support of approximately conical form and arranged with its apex upward, said support being enlarged at its center and having an annular shoulder between the enlarged portion and the peripheral portion, the shoulder being threaded, the support having a depending nipple at the central opening and being enlarged at the upper end of the opening to form a socket at the apex, the support having a transverse opening between the central opening and the shoulder, flexible members detachably connected at one end to the under face of the disk and having hooks at the opposite end for engaging a supporting vessel, a distending device of frusto-conical shape and having a longitudinal opening enlarged at the lower end and internally threaded to engage the threaded shoulder, the eccentric opening of the disk opening into the bore of the distender, interchangeable discharge nozzles adapted to be passed through the bore of the distender, each of the said nozzles having means for engaging the socket at one end, and being enlarged and rounded at the other end and having discharge openings at the said end, each nozzle being of greater length than the distender.

2. A device of the character specified, comprising a support having a central opening provided at its upper end with a socket and at its lower end with a nipple for engagement by a supply pipe, flexible members connected to the under face of the support and extending radially therefrom and having means at their ends for engaging the top of a vessel to support the support at approximately the center of the said top, interchangeable discharge tubes for engaging the socket, a distender of approximately frusto-conical shape and having a bore of greater diameter than the discharge tubes, said distender having means for engaging the support for detachably holding the distender coaxial with the central opening, said support having an eccentric opening communicating with the bore of the distender.

3. A device of the character specified, comprising a support having a central opening provided at its upper end with a socket and at its lower end with a nipple for engagement by a supply pipe, flexible members connected to the under face of the support and extending radially therefrom and having means at their ends for engaging the top of a vessel to support the support at approximately the center of the said top, interchangeable discharge tubes for engaging the socket, and a distending device of the tubular form, said distender and support having interengaging means for detachably connecting the distender to the support coaxial with the opening, said support having an eccentric opening communicating with the bore of the distender.

4. A device of the character specified, comprising a support having a central opening provided at its upper end with a socket and at its lower end with a nipple for engagement by a supply pipe, flexible and elastic members connected to the under face of the support and extending radially therefrom, and having means at their ends for engaging the top of a vessel to support the support at approximately the center of the said top, and interchangeable tubes for engaging the socket.

5. A device of the character specified, comprising a disk having a central opening and having radial flexible supporting members, each member having means for engaging the top of a vessel, interchangeable discharge tubes having means for engaging the opening, and a tubular distending device, said device and disk having interengaging means for supporting the distender coaxial with the central opening, said disk having an eccentric opening communicating with the bore of the distending device.

6. A device of the character specified, comprising a disk having a central opening and having radial flexible and elastic supporting members, each member having means for engaging the top of a vessel, and interchangeable discharge tubes having means for engaging the opening.

HENRY N. HARPER

Witnesses:
 J. J. BENNETT,
 R. B. DAWKINS.

Copies of this patent may be obtained for five cents each, by addressing the "Commissioner of Patents, Washington, D. C."